United States Patent

Fiacco et al.

[11] Patent Number: 5,860,149
[45] Date of Patent: Jan. 12, 1999

[54] MEMORY BUFFER SYSTEM USING A SINGLE POINTER TO REFERENCE MULTIPLE ASSOCIATED DATA

[75] Inventors: Peter Fiacco, Yorba Linda; Wayne Rickard, Oceanside; Vi Chau, Laguna Niguel, all of Calif.

[73] Assignee: Emulex Corporation, Costa Mesa, Calif.

[21] Appl. No.: 484,592

[22] Filed: Jun. 7, 1995

[51] Int. Cl.[6] .................................................... G06F 12/06
[52] U.S. Cl. ........................................... 711/209; 711/129
[58] Field of Search .................................. 395/456, 419; 711/209, 212, 129

[56] References Cited

U.S. PATENT DOCUMENTS

| | | | |
|---|---|---|---|
| 4,168,541 | 9/1979 | DeKarske | 365/49 |
| 4,453,216 | 6/1984 | Chiba et al. | 395/872 |
| 4,493,026 | 1/1985 | Olnowich | 395/455 |
| 4,511,964 | 4/1985 | Georg et al. | |
| 4,821,185 | 4/1989 | Esposito | 395/872 |
| 4,945,512 | 7/1990 | DeKarske et al. | 365/49 |
| 5,097,414 | 3/1992 | Tone | 395/444 |

*Primary Examiner*—Krisna Lim
*Attorney, Agent, or Firm*—Fish & Richardson P.C.

[57] ABSTRACT

A partitioned memory is divided into a number of large buffers, and one or more of the large buffers is divided to create an equal number of small buffers. Each remaining large buffer is associated with one small buffer, and the paired buffers may be addressed by a single pointer. The pointers are stored in a first-in-first-out unit to create a pool of available buffer pairs.

15 Claims, 5 Drawing Sheets

MEMORY BUFFER SYSTEM USING A SINGLE POINTER TO REFERENCE MULTIPLE ASSOCIATED DATA

BACKGROUND OF THE INVENTION

1. Field of the Invention

This invention relates to the partitioning of memory, and more particularly to the partitioning of memory into buffer pairs for use in transmit and receive protocols.

2. Description of Related Art

A computer system often contains a memory located between communicating components of the system. This memory compensates for differences in transmitting, receiving, or processing speeds of the components. The memory stores data so that the slower component is not overwhelmed, and frees the faster component for other tasks. In addition, the memory can act as a switchboard, routing data to the proper receiving component. Each sending component can place a message into the memory, and then a control circuit for the memory could read an address header in the message to determine which component receives the message.

The memory is often partitioned into blocks, or buffers, to facilitate data transfer between the components. A primary advantage to partitioning is that each buffer contains only one (or a portion of one) message, and this increases the speed of the memory control program. In addition, in many communication protocols, each message has a maximum length, sometimes called a frame size. By making the size of the buffer equal to the frame size, each message will occupy only one buffer, and further increases in speed are possible.

Traditional methods of partitioning memory into buffers divide the block into a number of buffers of equal size (called the blocking factor). Both the number of buffers, and the size of buffers, are typically a power of two. For example, a 32Kbyte memory block could be partitioned as two buffers with a blocking factor of 16Kbytes, four buffers with a blocking factor of 8Kbytes, eight buffers with a blocking factor of 4Kbytes, and so on. Each buffer is then used to temporarily hold a unit of data for transfer between components of the computer system.

A memory utilization problem occurs in data transfer if the typical size of a transferred block of data is just slightly larger than the blocking factor. For example, if each buffer is 2048 bytes, and a typical transfer is 2072 bytes, then the additional 24 bytes must be stored in a second buffer. Alternately, the blocking factor could be increased by a factor of two to 4096 bytes. In both cases, a significant portion of available memory is wasted. This inefficient memory utilization problem is common in data transfer systems due to the addition of control information to the data. As shown in FIGS. 1 and 2, data is usually transferred between components of a computer system 10 in packets 30. The computer system 10 typically includes nodes 12, such as computers, printers, and servers, linked by local area networks 15. Local area networks (LANs) 15 may themselves be linked by a wide area network (WAN) 17. In addition, each node 12 may be connected to devices 22, such as disk drives or other peripheral components, through a communication link 25. The communication link 25 may be a familiar interface such as a SCSI or a peripheral component interconnect (PCI). Each device 22 is connected to the communications link 25 by a bus interface unit (BIU) 27.

A typical packet 30 contains a data portion 32, a header 34, and a trailer 36. The header 34 identifies the source and destination of the data 32 and may contain other control information. The endpoints of a particular data transfer (i.e., the source and destination) are likely to use an efficient blocking factor to ensure efficient memory storage. Each time a packet 30 moves in a computer system 10, additional information may be added to the header 34.

There are three problems when a data packet 30 is stored in a buffer between the endpoints of a data transfer. First, because the header 34 has been added to the data 32, the packet as a whole no longer has an efficient overall blocking factor. Therefore, the memory utilization difficulty mentioned above is more likely to occur. Second, some intervening control information in the header 34 must be skipped when transferring multiple blocks of packet data out of the buffer. This introduces inefficiencies, such as when a direct memory access (DMA) state machine needs to be reinitialized at each new buffer transfer. Whether the data packet 30 is moving between devices 22 connected to the same link 25, or between hosts connected by WAN 17, inefficient use of buffers may occur.

Memory blocks have been divided into pairs of buffers holding related information for data transfer purposes. It is desirable to refer to a buffer pair using a single address to ensure a link between the buffers and for ease of processing. One traditional method of addressing a buffer pair is to use a lookup table, but this requires software intervention. Another method is to use a sequential access rule in which buffer N holds control information and buffer N+1 holds data, but this requires the two buffers to be the same size. Another method is to concatenate the control information and data in a single buffer, with the data starting at a known offset from the control information, but this requires an inefficient oversized buffer. Another problem with some of the above methods is that the addition of a single memory component requires reconfiguring the addressing scheme.

Hardware-based mechanisms for linking buffer pairs require physically separate memories, because the simplest way to allocate scalable addressing for split buffers is to have an address gap between the two buffer sets in the minimum configuration.

In view of the foregoing, it is an object of the invention to provide a simple method of partitioning a memory which supports a split buffer pair with a large buffer to hold data and at least one associated small buffer to hold control information.

It is another object of the invention to address such a split buffer pair with a single address.

It is yet another object of the invention to provide a split buffer model in which the memory is scalable, with each memory block having the same partitioning as the first block, and in which the total memory may be easily increased by the addition of a single memory component.

It is still another object of the invention to provide a first-in-first-out device to manage the available split buffers.

The present invention meets these needs.

SUMMARY OF THE INVENTION

The invention is directed to partitioning a memory. In particular, the memory is divided into large buffers. One or more of the large buffers is divided into small buffers. Each remaining large buffer is associated with at least one small buffer and the associated buffers may be addressed by a single address.

In the preferred embodiment, there are an equal number of large and small buffers, and each large buffer is paired with exactly one small buffer.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 3:
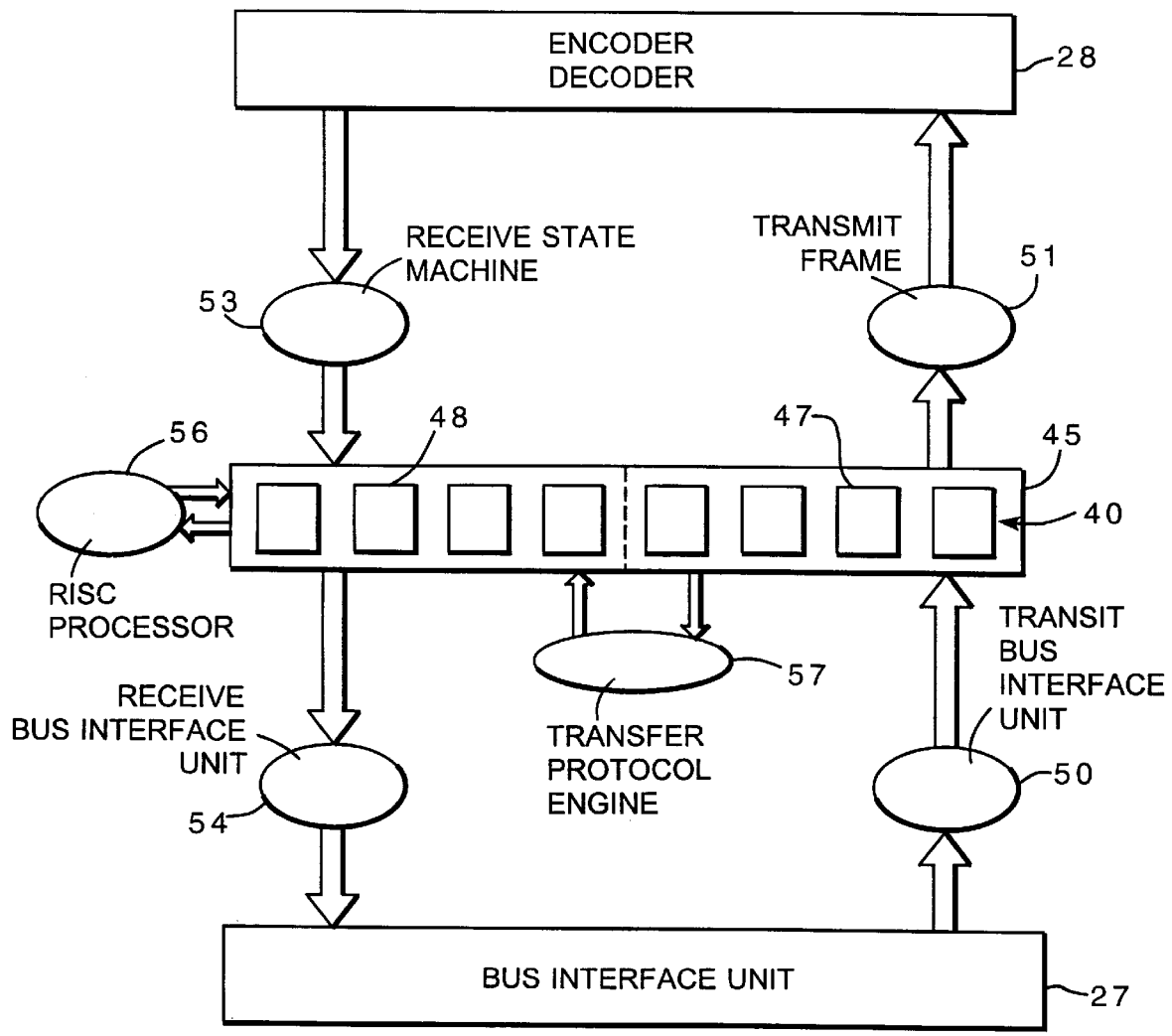
FIG. 3 is a block diagram showing the flow of data between frame buffers, state machines, the bus interface unit, and communications link.

FIG. 3 shows an example of a system in which the present invention may be used advantageously. Data packets are moved between one component of a computer system, such as a bus interface unit (BIU) 27, and another component, such as a communications link encoder/decoder (NDEC) 28. A memory 45 is located "between" (i.e., in the data path of) BIU 27 and ENDEC 28, and is divided into frame buffers 40. The memory preferably 45 has a fast access time, and is preferably RAM. In a typical data transfer, data moves from a sending component into a frame buffer 40, and then from the frame buffer 40 into the receiving component. Thus, the frame buffers 40 in memory 45 are used as temporary storage for data passing between the BIU 27 and the ENDEC 28.

Figure 1:
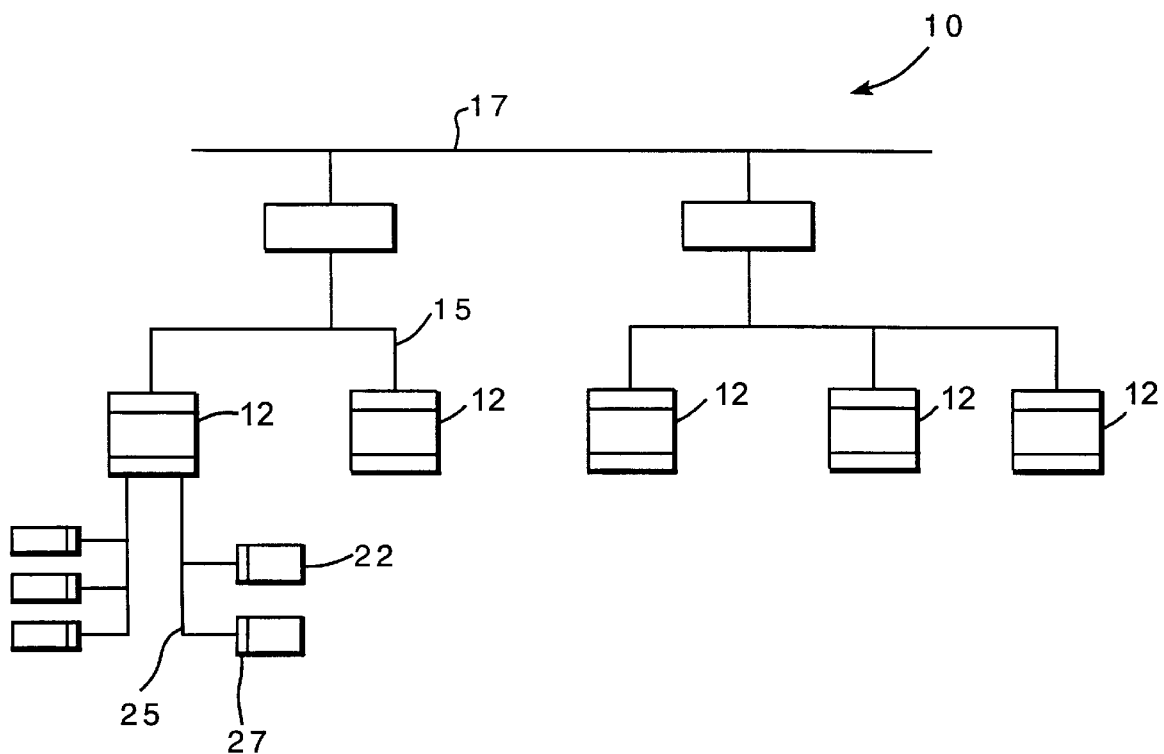
FIG. 1 is a block diagram of a typical prior art computer system.
Figure 2:
FIG. 2 is a schematic illustration of a prior art packet transferred between the components of a computer system.

Each link 25 (or node 12) in FIG. 1 will typically have a microprocessor containing a number of state machines, shown in greater detail in FIG. 3. In general, these state machines, which may be software or hardware, can be implemented according to practices known in the art. When a BIU 27 transmits data, a state machine Transmit Bus Interface Unit 50 moves data from the BIU 27 into a transmit frame buffer 47, and a Transmit Frame state machine 51 moves data from the transmit frame buffer 47 to the ENDEC 28. When the BIU 27 receives data, a Receive state machine 53 moves data from the ENDEC 28 to a receive frame buffer 48, and a Receive Bus Interface Unit state machine 54 moves data from the receive frame buffer 48 to the BIU 27. A transfer protocol engine state machine 57 manages the transfer protocol and lower level state machines.

A RISC microprocessor 56, has access to the contents of buffers 40, preferably on word boundaries. The RISC microprocessor 56 manages the interface between the host and the inventive system. While RISC microprocessor 56 has access to all state machine and buffer RAM for control and initialization purposes, it does not participate directly in the transfer of data between buffers and state machines.

Figure 4:
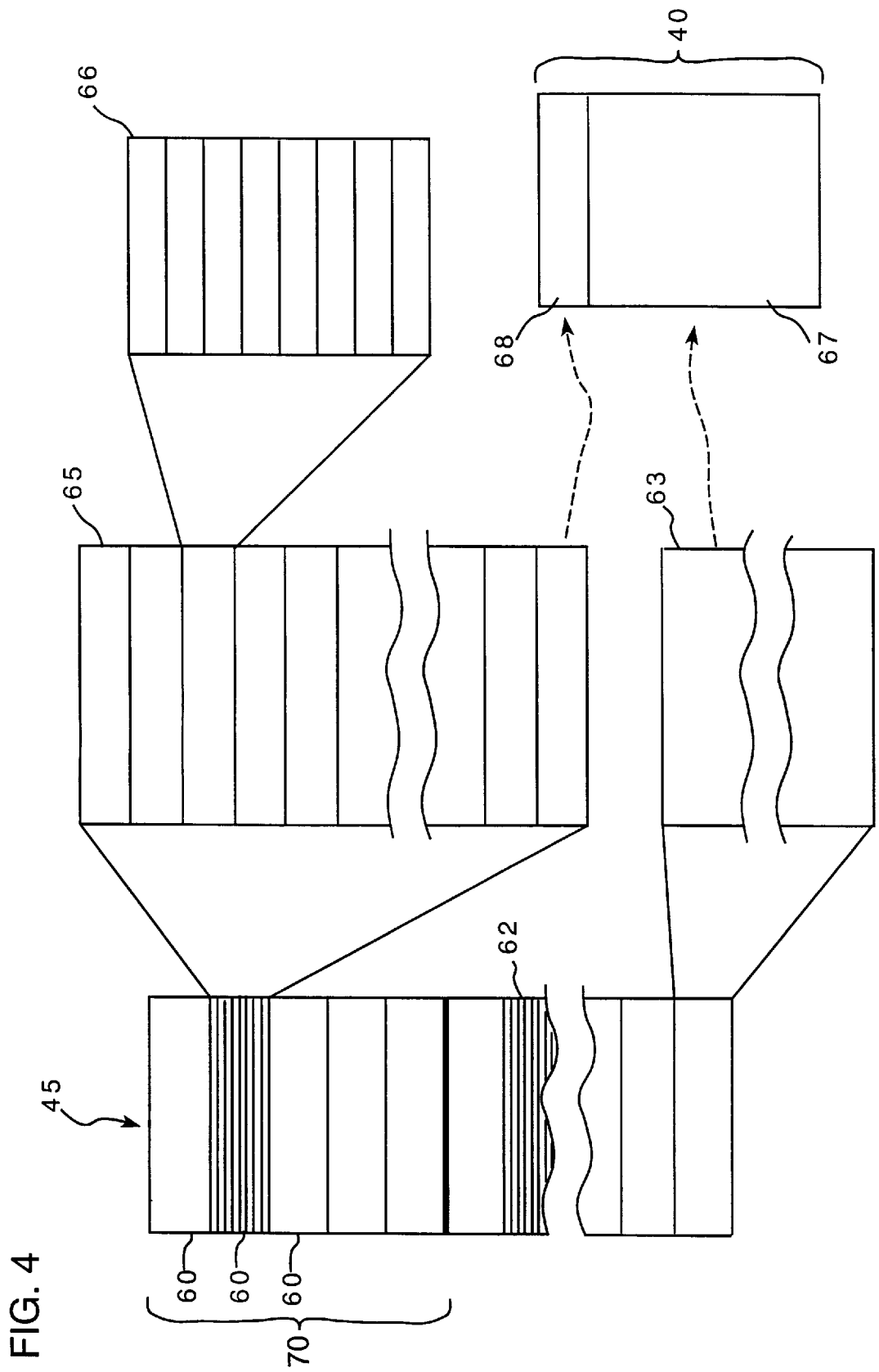
FIG. 4 is a schematic diagram of a memory partitioned according to the invention.

Partitioning of the buffer memory 45 in accordance with the present invention is shown in FIG. 4. During initialization, the memory 45 is partitioned into an array of blocks 60. Blocks 60 include one or more blocks 62 are further partitioned into sub-blocks 65. Each sub-block 65 is composed of individual words 66.

The remaining blocks 60 are not sub-divided, as shown by block 63. In the preferred embodiment, the memory 45 is partitioned so that there are n blocks 60 and a total of n sub-blocks 65 within each partitioned block 62. Thus, each sub-block 65 is 1/n the size of a block 60 (note that there will be a number m of sub-partitioned blocks 62). Each remaining block 63 is associated in a one-to-one correspondence with one of the sub-blocks 65 to form a frame buffer 40. Thus, the partitioning produces n-m frame buffers 40, with each frame buffer 40 including a large buffer 67 (the remaining block 63) and a small buffer 68 (a sub-block 65).

Naturally, other partitionings are possible. For example, there need not be an equal number of blocks 60 and sub-blocks 65. For instance, there might be twice as many sub-blocks 65 as blocks 60, in which case each frame buffer 50 could include a single large buffer 67 and two small buffers 68. However, the preferred partitioning allows each frame buffer 40 to be accessed by a single address.

The memory 45 may have a number of memory modules 70. Each memory module 70 can be, for example, a commercially available 128Kbyte chip. As will be described, the memory 45 may be partitioned so that additional memory modules 70 may be added without changing the partitioning scheme. Specifically, each module 70 is divided into a set number of blocks 60, and only one block 62 in each module 70 is further divided into sub-blocks 65. Thus, each additional module has the same partitioning as previous modules.

Figure 5:
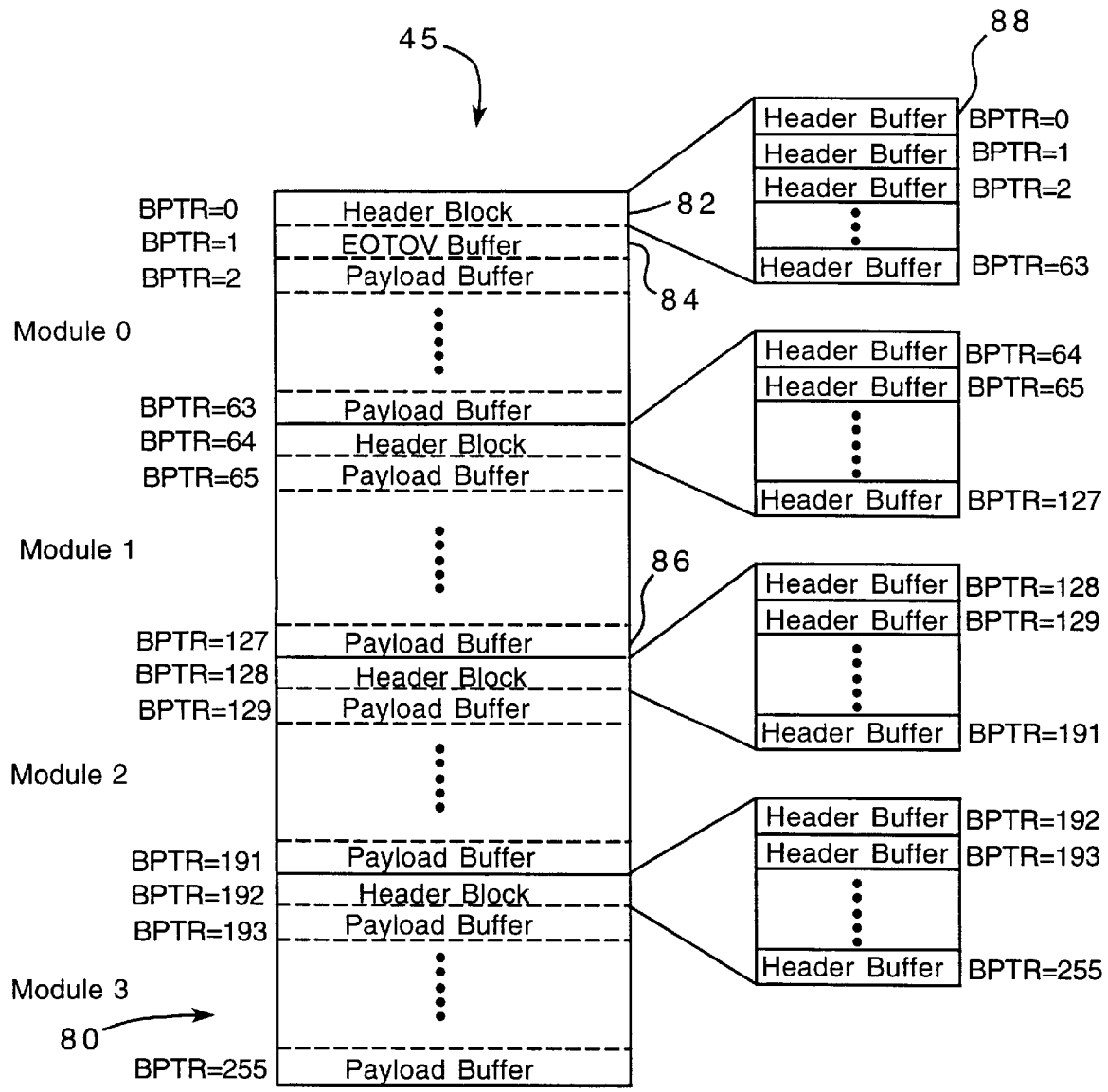
FIG. 5 is a schematic diagram of the preferred partitioning.

A specific preferred embodiment to carry out the invention is shown in FIG. 5. Each module 80 is divided into 64 blocks. Each block has the same size, such as 512 32-bit words, but the size of each block can depend on the total size of memory 45 and the number of modules. For example, each 128KByte module 80 can be divided into 64 blocks addressed on a mod-512 word (2048 bytes) boundary. The blocks are addressed by assigning each block a buffer pointer (BPTR) using the upper 8 address bits of the memory location of the block.

Some of the blocks in the module 80 are allocated for use as a header block 82, or an ED_TOV Timer engine buffer 84. The remaining blocks are available as payload buffers 86 to store data 32. Preferably, the first buffer in each memory block 60 is used as a frame header buffer area 62 and the second buffer in the first memory block is used as the timer engine buffer area 66.

Preferably, each payload buffer is 512 words (2048 bytes) long. Each header block 82 is further divided into smaller header buffers 88 to store control information from a header 34 and a trailer 36. Preferably, the header buffer area 82 is divided into 64 smaller buffers 88, each 8 words (32 bytes) long.

In the preferred embodiment, depending of the size of memory 45, there may be a total of 64, 128, 192, or 256 blocks. With four modules 80, there are a total of 256 blocks and 256 header buffers. However, each module 80 may be divided into fewer or more than 64 blocks. Preferably, memory 45 is divided into a number of blocks which is a power of two. This allows the payload buffers 86 and header buffers 88 to be accessed by a single address which is changed by a simple shift operation, thereby eliminating the need for a complex address ALU.

Each larger payload buffer 86 is associated with a corresponding smaller header buffer 88. Although physically "split" in memory 45, the large and small buffers are logically bound and may be addressed as a single frame buffer 40. A buffer pointer is merely shifted to alternate between addressing each small buffer 88 and each large buffer 86. In the preferred embodiment, the memory 45 is addressable by a nominal 32-bit address, but each address actually uses only the lower 20 bits in the preferred embodiment (the upper 12 bits are fixed). The upper 8 bits of the 20 bits serves as a buffer pointer, while the lower 12 bits serves as an offset value for the large buffer 86 (the small buffer 88 uses 3 of the lower 12 bits as an offset value).

The first word in the large buffer 86 is accessible by placing the upper 8 bits representing each pointer into the upper 8 bits of the payload memory address word, leaving the remaining bits as zero. The first word of the small buffer 88 is accessible by placing the upper 2 bits of the 8 bits representing each large buffer pointer at the most significant bit location of the header memory address word, then setting the next 6 bits at zero, and then placing the remaining 6 bits of the pointer after the 6 zero bits, leaving the remaining bits as zero. Thus, the address of the header buffer 88 can easily be derived from the address of the payload buffer 86 by copying 2 bits and simply shifting the next 6 bits to the right.

Examples of this addressing scheme are given below:

| Pointer | Payload Memory Address | Header Memory Address |
|---|---|---|
| 3   | 0000\|0011\|0000\|00 . . . | 0000\|0000\|0000\|1100 . . . |
| 63  | 0011\|1111\|0000\|00 . . . | 0000\|0000\|1111\|1100 . . . |
| 65  | 0100\|0001\|0000\|00 . . . | 0100\|0000\|0000\|0100 . . . |
| 127 | 0111\|1111\|0000\|00 . . . | 0100\|0000\|1111\|1100 . . . |
| 129 | 0100\|0001\|0000\|00 . . . | 0100\|0000\|0000\|0100 . . . |
| 191 | 0110\|1111\|0000\|00 . . . | 0100\|0000\|1111\|1100 . . . |
| 193 | 1110\|0001\|0000\|00 . . . | 1100\|0000\|0000\|0100 . . . |
| 255 | 1111\|1111\|0000\|00 . . . | 1100\|0000\|1111\|1100 . . . |

State machines 50–57 may be modified to strip control information in the header 34 and the trailer 36 from each packet 30 and store it in a small buffer 88, while storing associated data 32 in an associated large buffer 82. Specifically, a requesting state machine may receive a single address pointer from a buffer pool. The state machine then separates control information and payload according to protocols known in the art, and stores the data to the payload buffer indicated by the address. Then, the state machine calculates the address as described above, and stores the control information to that address.

If a data transfer protocol sends payloads 32 of a fixed size, then the memory blocking factor may be set equal to the payload size so that payloads are efficiently packed into the memory 45. For example, for $2^n$ byte payloads, each payload buffer can be $2^n$ bytes in size, which is more efficient for disk and network traffic.

As a result of the preferred addressing scheme of the present invention, the total size of the memory 45 is scalable in increments, preferably 128Kbytes in size. As additional memory modules are added, both payload buffers 86 and header buffers 82 are added as part of the memory block partitioning. Thus, a scalable minimum configuration buffer system may be built with a single memory component, and the system may be expanded with additional memory modules.

The preferred partitioning formats are summarized by the table below:

| #Memory Modules | 1 | 2 | 3 | 4 |
|---|---|---|---|---|
| Memory Size      | 128kB | 256kB | 384kB | 512kB |
| Payload Buffer Size | 2048B | 2048B | 2048B | 2048B |
| Header Buffer Size  | 32B   | 32B   | 32B   | 32B   |
| #Total Blocks    | 64  | 128 | 192 | 256 |
| #Header Blocks   | 1   | 2   | 3   | 4   |
| #Timer Buffers   | 1   | 1   | 1   | 1   |
| #Payload Buffers | 62  | 125 | 188 | 251 |
| #Header Buffers  | 64  | 128 | 192 | 256 |

Figure 6:
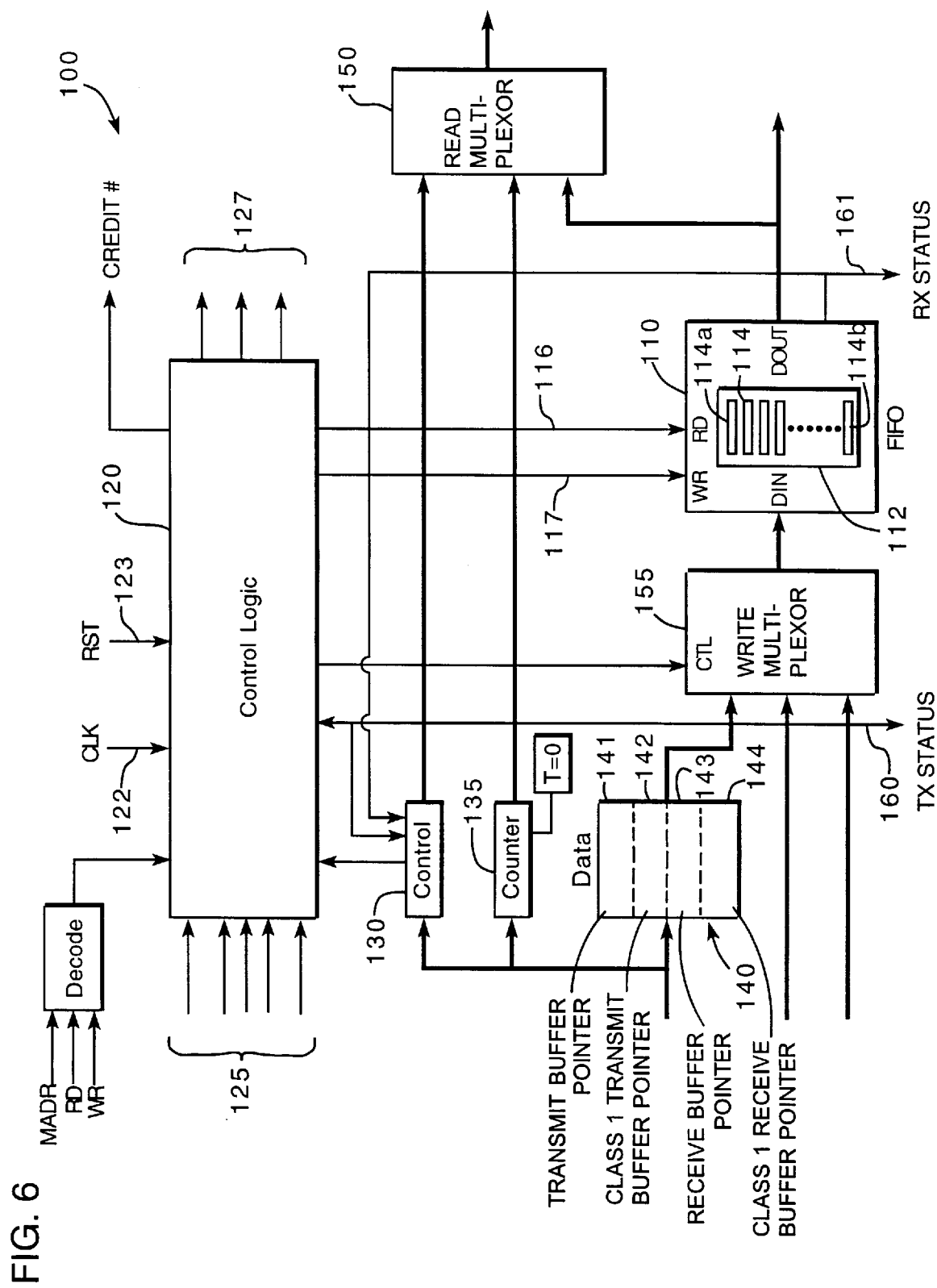
FIG. 6 is a block diagram of an implementation of a free buffer pool.

The buffer pairs may be managed through the use of a free buffer control system 100 shown in FIG. 6. Control system 100 includes a first-in-first-out (FIFO) storage unit 110. The FIFO unit 110 stores a list 112 of buffer pointers 114 which indicate available buffers. When one of the state machines or the RISC microprocessor has data to transmit or receive, a buffer is allocated by removing a pointer 114a from the top of the list 112 and assigning it. When the state machine or RISC microprocessor has completed its task, the buffer is released and returned to the buffer pool by adding the pointer 114b to the bottom of the list 112. Thus, the control system 100 treats the buffers as a floating pool, with buffers provided to the state machines or microprocessor on an on demand basis, and returned to pool in any order.

At initialization, the pointers corresponding to frame buffers 40 are loaded into FIFO unit 110. In the embodiment shown in FIG. 5, pointers BPTR 2–63, 65–127, 129–191, and 193–255, corresponding to payload buffers 86 which can be matched with header buffers 88, are loaded into the FIFO unit 110. Thus, the list 112 contains a total of 251 frame buffers.

In FIG. 6, the FIFO unit 110 is preferably a hardware device. The FIFO unit 110 can be implemented in software, but software is not preferred because is slower than hardware and requires memory cycles to determine the status of the buffers. In a hardware implementation, the FIFO can be read and written at the same time (i.e., dual ported). In the preferred embodiment, the FIFO unit 110 can store 256 8-bit pointers, but alternatively could be of any size.

In the illustrated embodiment, manipulation of the FIFO unit 110 is carried out by READ and WRITE commands to the FIFO 110 from lines 116 and 117, respectively. A READ command removes a buffer pointer 114a from the top of the buffer pool and assigns it to the device that performs the read operation. A WRITE to the FIFO 110 returns the buffer pointer 114b to the bottom of the pool. Both the state machines and the RISC microprocessor can read and write the FIFO 110.

In the illustrated embodiment, READ and WRITE commands are issued to FIFO unit 110 by control logic 120. The control logic 120 is timed by a clock signal 122 and restarted by reset signal 123. The control logic 120 receives signals 125 identifying a state machine or RISC microprocessor which is requesting the issuance of commands to FIFO unit 110, and acknowledges the requests by signals 127.

In the illustrated embodiment, the RISC microprocessor treats the control system 100 as a set of READ/WRITE registers any command to READ or WRITE by the RISC microprocessor is executed in two clock cycles, and requests by the RISC microprocessor are always acknowledged, regardless of whether the FIFO unit 110 is empty. However, all RISC READ requests are serviced with an "empty" status passed in the read data payload.

In the illustrated embodiment, READ and WRITE requests from the state machines are arbitrated before being acknowledged. Requests to READ or WRITE by the state machines are not acknowledged by the control logic 120 until the FIFO unit 110 has an available buffer. This ensures that each requesting state machine is certain to receive a valid buffer pointer when acknowledged. The state machines preferably are constructed so that they cannot continue their process until their outstanding requests are acknowledged.

Buffers in list 112 may be used either as transmit buffers to store data to be transmitted by the BIU 27, or receive buffers to data to be received from the communications link 28. Some requestors, such as RX state machines, only request receive buffers. Other requesters, such as TX state machines, only request transmit buffers. In these cases, the control logic 100 infers the type of buffer requested from the identity of the requestor. Other requestors, such as the RISC microprocessor, can request either type of buffer. In this case, the requestor provides an additional signal to the control logic 100 to identify the type of buffer requested.

In the illustrated embodiment, the control system 100 includes 6 registers or counters utilized by the control logic 120. A control/status register 130 contains basic information. A transmit buffer counter 135 contains the number of available transmit buffers. A RISC data register 140 actually contains 4 registers which classify the type of request by whether it is for a transmit or receive buffer, and whether it will assert a CREDIT# signal. The contents of the control/status register 130 and counter 135 are accessible to the RISC microprocessor because they are entered into a read multiplexer (RD MUX) 150.

In the illustrated embodiment, the control/status register 130 can hold up to one word (32 bits), but in the preferred embodiment only 5 of those bits are used. The remaining bits are reserved for later development. The zero bit defaults to "0", and is set to "1" to grant the RISC microprocessor exclusive access to the FIFO unit 110. The first bit defaults to "0", and is set to "1" to disable the separation of free buffers into transmit and receive buffers. When this occurs, the RISC microprocessor may access the free buffer pointers by any of the access registers. The second bit defaults to "0", but can be set to "1" to clear the pointers in the FIFO unit 110 so that the entire FIFO is re-initialized. The second bit must be cleared before the FIFO unit 110 can function again. The third bit is read only, and is set to "1" when the transmit FIFO is empty, and is set to "0" when the transmit FIFO is not empty. The fourth bit is also read only, and is set to "1" when the receive FIFO is empty, and is set to "0" when the receive FIFO is not empty.

The transmit buffer counter 135 contains the number of available transmit buffers. The counter 135 is decremented each time a READ command for a transmit buffer is sent to the FIFO unit 110, and incremented each time a WRITE command for a transmit buffer is sent to the FIFO unit 110. In the illustrated embodiment, the transmit buffer counter 135 may be one word long, but uses only 8 bits to store the number of available transmit buffers. During initialization, the RISC microprocessor writes the maximum number of transmit buffers to the transmit buffer counter 135. The field is cleared by a hardware reset, or by a WRITE by the RISC microprocessor to the control register 130 with the second bit set. If desired, the control logic 120 may be set to provide an alarm when the transmit buffer counter 135 decreases below a threshold number.

The commands by state machines are relatively straightforward. When a READ command is executed, a buffer pointer 114a is output from the FIFO unit 110 on line DOUT. The requesting state machine is connected to the DOUT line, and will proceed to use the indicated buffer. When a WRITE command is executed, a buffer pointer is loaded into a write multiplexer (WR MUX) 155 from a state machine. Then, the buffer pointer is input into the FIFO unit 110 on line DIN.

In the illustrated embodiment, the RISC data register 140 contains 4 registers 141–144. Each individual register can contain one word, but uses only 8 bits to store a buffer pointer. Registers transmit buffer pointer 141 and class 1 transmit buffer pointer 142 are used for reading or writing transmit buffers. When the transmit FIFO is empty, registers XBPTR 141 and C1XBPTR 142 will also be empty, and the third bit in control register 130 will be set to one by the RISC microprocessor. Registers receive buffer pointer 143 and class 1 receive buffer pointer 144 are used for reading or writing receive buffers. When the FIFO unit 110 is entirely empty, and there are no transmit or receive buffer pointers remaining in the list 112, then registers RBPTR 143 and CLRBPTR 144 will also be empty, and the third and fourth bits in control register 130 will be set at one by the RISC microprocessor.

In the illustrated embodiment, the control logic 120 asserts a CREDIT# signal each time a buffer pointer is returned to either the XBPTR register 141 or RBPTR register 143. The control logic 110 does not assert the CREDIT# signal if a buffer is returned to the C1XBPTR register 142 or the C1RBPTR register 144. The CREDIT# signal may be used for protocols that use flow control mechanisms. Additional registers could be added to the data register 140, so that multiple different types of signals could be asserted by the control logic 110.

The buffer control system 100 also maintains two status signals that are available to the state machines and to the RISC microprocessor on the buffer pointer read ports. When the transmit buffer counter 135 is zero and there are no available transmit buffers, status signal TXSTATUS on line 161 is set true. A second status signal RXSTATUS on line 162 is set true when the FIFO unit 110 is empty and there are no buffers, transmit or receive, available. These status signals may also be fed to the third and fourth bits of control register 130.

In summary, the invention provides a simple method of efficiently partitioning a memory by supporting a split buffer pair. A large buffer is efficiently sized to hold data, and at least one associated small buffer is efficiently sized to hold control information. The invention further provides a simple method for addressing such a split buffer pair. In the preferred embodiment of the invention, the split buffer model is scalable, with each memory block having the same partitioning as the first block, so that the total memory may be easily increased by the addition of a single memory component.

A number of embodiments of the present invention have been described. Nevertheless, it will be understood that various modifications may be made without departing from the spirit and scope of the invention. For example, although the memory in the preferred embodiment is located between a BIU and a communications link the invention applies to data transfer between any two components in a computer system. Accordingly, it is to be understood that the invention is not to be limited by the specific illustrated embodiment, but only by the scope of the appended claims.

What is claimed is:

1. A method of partitioning a buffer memory, comprising:
   (a) dividing the buffer memory into a first number of large blocks;
   (b) dividing at least one of the large blocks into a second number of small blocks;

(c) associating each remaining large block with at least one small block as a linked buffer pair; and (d) addressing each linked pair of associated large and small blocks with a single pointer.

2. The method of claim 1 wherein the first number equals the second number.

3. The method of claim 2 wherein each remaining large buffer is associated with a single small buffer.

4. The method of claim 3, further comprising shifting a portion of the pointer to alternate between the small buffer and the large buffer.

5. The method of claim 3 wherein each of the large buffers contains an equal number of bytes and each of the small buffers contains an equal number of bytes.

6. The method of claim 2 wherein the first number is an integer multiple of 64.

7. A method of partitioning a buffer memory, comprising:

(a) dividing the buffer memory into a plurality of large blocks;

(b) dividing at least one of the large blocks into a plurality of small blocks;

(c) associating each remaining large block with at least one small block as a linked buffer pair; and (d) addressing each linked pair of associated large and small blocks with a single pointer.

8. A method of partitioning a memory, comprising:

(a) dividing the memory into a first number of large buffers;

(b) dividing one of the large buffers into a second number of small buffers;

(c) associating each remaining large buffer in the memory with at least one small buffer in the memory as a linked buffer pair; and (d) addressing each linked pair of associated large and small buffers with a single pointer.

9. The method of claim 8 wherein exactly one of the large buffers is divided into a second number of small buffers.

10. The method of claim 9 wherein the first number equals the second number.

11. The method of claim 8 further comprising adding a new memory module to the memory and partitioning the new memory module in the same manner as the previous memory.

12. An apparatus for storing data comprising:

(a) a memory divided into a first number of large blocks, at least one of the large blocks divided into a second number of small blocks, each remaining large block associated with at least one small block as a linked buffer pair; and (b) a plurality of buffer pointers, each linked pair of associated large and small blocks addressed by a single buffer pointer.

13. The apparatus of claim 12 wherein the first number equals the second number.

14. The apparatus of claim 13 wherein the memory address of the small buffer constitutes a shift of a portion of the memory address of the large buffer.

15. The apparatus of claim 13 wherein each of the large buffers contains an equal number of bytes and each of the small buffers contains an equal number of bytes.

* * * * *